United States Patent [19]

Kernander et al.

[11] 4,038,938
[45] Aug. 2, 1977

[54] BISTABLE CLAMPING MECHANISM FOR AN INDICATING NEEDLE OF AN INSTRUMENT

[75] Inventors: Warren N. Kernander, Boxford; William J. Schultz, Lynnfield, both of Mass.

[73] Assignee: General Electric Company, Schenectady, N.Y.

[21] Appl. No.: 730,776

[22] Filed: Oct. 8, 1976

[51] Int. Cl.² .................... G01D 11/16; G01D 11/18
[52] U.S. Cl. .............................. 116/129 N; 116/129 R
[58] Field of Search ............ 116/129 N, 129 R, 136.5, 116/129 B; 324/157; 73/23

[56] References Cited

U.S. PATENT DOCUMENTS

| | | | |
|---|---|---|---|
| 2,408,944 | 10/1946 | Miller | 116/136.5 |
| 2,648,254 | 8/1953 | Stimson | 116/136.5 |
| 2,982,190 | 5/1961 | Fischer | 354/61 |
| 3,087,380 | 4/1963 | Greger | 324/157 |
| 3,181,498 | 5/1965 | Nankervis | 116/129 R |
| 3,254,533 | 6/1966 | Tongret | 73/362 AR |
| 3,403,656 | 10/1968 | Barry | 116/129 R |
| 3,529,570 | 9/1970 | Engelhard | 116/129 N |

Primary Examiner—S. Clement Swisher
Assistant Examiner—Denis E. Corr
Attorney, Agent, or Firm—Vale P. Myles

[57] ABSTRACT

An instrument having an indicating scale and a pointer movable in relation thereto is provided with a pointer clamping mechanism having a bistable retainer that cooperates with a manually operable actuating member to selectively retain the clamping member in either its pointer-clamping position or in a stored position after it is moved to one of such positions by the actuating member. Positive movement of the clamping member between its two positions is achieved by a connector fastened directly to the clamping member and coupled to the actuating member in a manner that causes the connector to be resiliently loaded when the clamping member is moved away from its stored position.

8 Claims, 3 Drawing Figures

BISTABLE CLAMPING MECHANISM FOR AN INDICATING NEEDLE OF AN INSTRUMENT

BACKGROUND OF THE INVENTION

This invention relates to indicating meters having means for locking an indicating pointer or dial in a given position relative to an indicating scale of the meter, and more particularly relates to an indicating instrument pointer clamping mechanism that includes a bistable retainer for holding the clamping mechanism in either its clamping position or in a stored position, while providing a positive drive means to move the clamping member between said positions.

It is fairly conventional practice to provide certain types of portable indicating instruments with indicating pointer locking means whereby the indicating pointer of an instrument can be selectively locked in a given position relative to an indicating scale on the instrument. Typically such pointer clamping mechanisms are employed on instruments that are frequently used in circumstances such that a meter reading must be taken while the indicating scale of the meter is beyond the view of an operator. For example, a toxic gas instrument may be held in a confined space to monitor a suspected gas leak, thereby placing the indicating scale of the instrument in a position that is difficult or impossible for the operator to read. Alternatively, a clamp-on ammeter may be positioned around a conductor that is awkwardly placed such that an operator could not conveniently read the resultant current indication on the indicating scale of the instrument. In these cases, it is expedient for the operator to simply place the meter in the desired, somewhat inaccessible location to enable it to sense the monitored gas or current, as the case may be, then manually depress an indicating pointer clamping mechanism on the instrument to lock-in the meter reading so that the meter may be moved to a more accessible position in which the operator can readily read the recorded indication of the pointer relative to the indicating scale.

Examples of two generally known types of prior art indicating instrument pointer clamping mechanisms are shown respectively in U.S. Pat. No. 2,982,190—Fischer which issued on May 2, 1961 and U.S. Pat. No. 3,529,570—Englehard which issued on Sept. 22, 1970. As is somewhat typical of such indicating pointer clamping mechanisms, these patents illustrate the use of a generally U-shaped, pivotally mounted pointer clamping member that is operable to selectively engage an instrument indicating pointer and force it against the meter scale or a portion of the meter housing to lock the pointer in position in response to manual actuation by an operator. The generally U-shaped pointer clamping members of these mechanisms and related known prior art mechanisms are sufficiently wide to overlap the entire range of movement of the meter indicating pointer so that the clamping member can lock the pointer in position against the meter scale at any point thereon in which readings are capable of being taken. Another feature of these types of clamping mechanisms is that they employ resilient means to bias the clamp to its stored or non-clamping position. However, these mechanisms and related known prior art mechanisms do not provide for bistable latching of the pointer clamping member in both its pointer-clamping position and its stored position. Another shortcoming of such known commercially available systems is that they fail to provide for positive manual actuation of the pointer clamping member in both clamping and releasing positions thereof.

In order to assure free and accurate movement of an instrument indicating pointer relative to a clamping member associated therewith, while at the same time assuring a positive locking action of the clamping member relative to the indicating pointer when the clamping member is actuated, it is desirable to assure both firm engagement and positive disengagement between an indicating pointer and a clamping member when such modes of operation are desired. Specifically, it is most desirable to avoid any dragging relationship between the clamping member and the instrument indicating pointer while an instrument reading is being taken, prior to intentional movement of the clamping member to its clamping position.

OBJECTS OF THE INVENTION

Accordingly, it is a primary object of the present invention to provide an instrument pointer clamping mechanism that overcomes the shortcomings and disadvantages of related prior art mechanisms as explained above.

Another object of the invention is to provide an indicating pointer clamping mechanism that incorporates a bistable retainer means for holding a clamping member in either its clamping position or a stored position, while providing for positive movement of the clamping member between said positions responsive to movement of a manually operable actuating member.

Still another object of the invention is to provide an indicating instrument pointer clamping mechanism that is simple to manufacture, rugged in construction and durably designed to afford accurate and positive clamping of an indicating instrument pointer while avoiding inadvertent drag on the indicating pointer during non-clamping phases of its operation.

Additional objects and advantages of the invention will become apparent to those skilled in the art from the description of it presented herein taken in connection with the accompanying drawings.

SUMMARY OF THE INVENTION

In one preferred embodiment of the invention an indicating instrument having an indicating scale thereon and a relatively movable pointer positioned to move over the scale is provided with a pointer clamping mechanism that is manually operable to pivot a generally U-shaped clamping member against the indicating pointer to clamp it in position against the indicating scale responsive to an operator moving an actuating member of the clamping mechanism. Reverse movement of the actuating member by the operator positively moves the clamping member away from the indicating pointer to a stored position. A bistable retainer member is coupled to the actuating member and via a resilient connector to the clamping member and is operable to secure the actuating member and the clamping member selectively in either a pointer clamping position of the clamping member or in the stored position thereof. The connector is positively fastened to the clamping member and is directly connected to the actuating member to afford positive movement of the clamping member between its clamping and its stored position.

BRIEF DESCRIPTION OF THE PREFERRED EMBODIMENT

Figure 1:
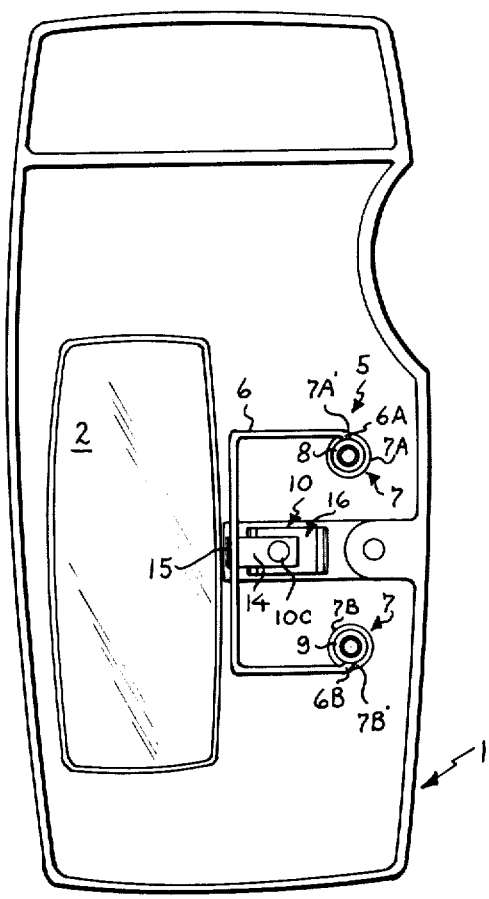
FIG. 1 is a top plan view of a portion of an indicating instrument housing incorporating an indicating instrument pointer clamping mechanism constructed pursuant to the present invention.
Figure 2:
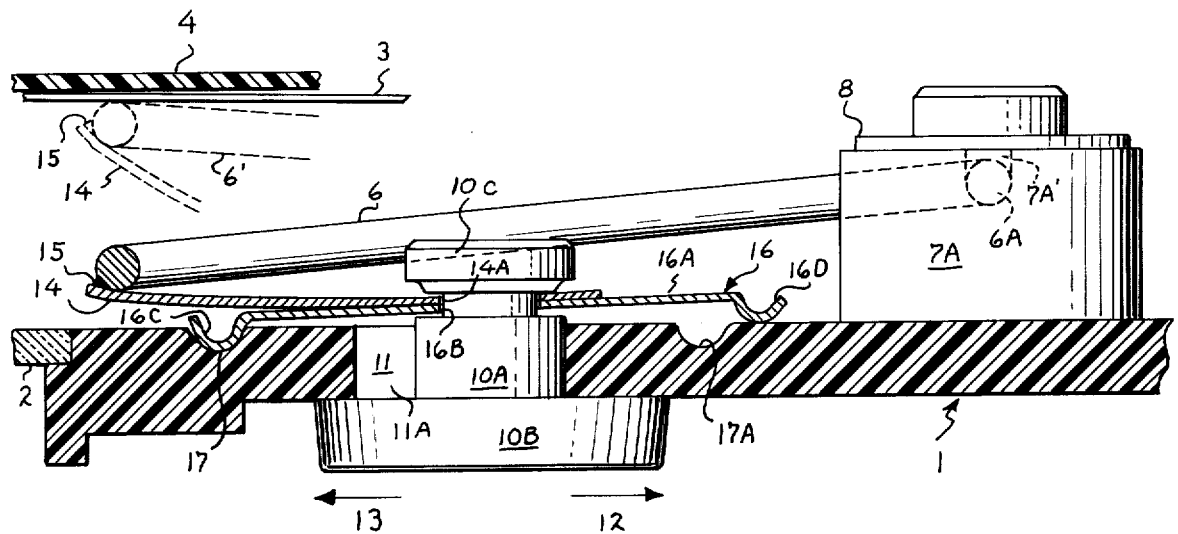
FIG. 2 is an enlarged, fragmentary side elevation view, partly in cross-section, showing the indicating pointer clamping mechanism of the invention illustrated in FIG. 1 in its assembled relationship to an indicating pointer and indicating meter dial against which the pointer is selectively secured to the clamping mechanism.
Figure 3:
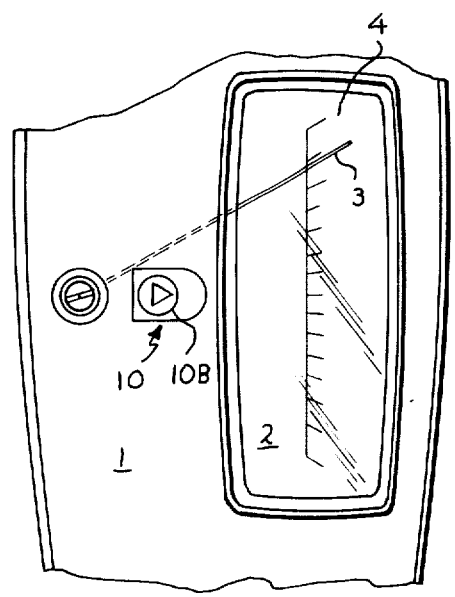
FIG. 3 is a fragmentary top plan view of the reverse side of part of the instrument housing shown in FIG. 1, illustrating a button portion of the actuating member of the instrument pointer clamping mechanism of the present invention.

The invention will be described by orienting it with respect to a conveniently portable, hand held instrument of the clamp-on ammeter or voltmeter type which incorporates an indicating scale that is arranged to cooperate with a pivotally mounted indicating vane or pointer in a generally well-known manner. However, it should be recognized that the invention is readily adaptable for use with other types of instruments or meters including those that utilize rotatable indicating dials, rather than indicating needles, to display a measured quantity. Referring now to FIG. 1 of the drawing, it will be seen that there is shown a molded plastic instrument housing element 1 that may be formed, for example, of a suitable impact resistant polycarbonate plastic such as that commercially available from General Electric Company under its trademark LEXAN. Only one-half of the total instrument housing is displayed in FIG. 1, with the interior surface of the housing element 1 being shown. In practice, a matching housing element half will be secured over the housing element 1 and fastened to it by ultrasonic welding, or other suitable means, to complete the protective housing of the indicating instrument. Included in the housing element 1 is a scale-viewing window 2 that may be ultrasonically welded or otherwise suitably secured in position on the housing 1. Of course, when the instrument is assembled a pivotally mounted indicating vane or pointer 3 (see FIG. 2) will be positioned in front of the window 2 and between it and an indicating scale 4 (also shown in FIG. 2) in any suitable conventional arrangement. To further orient the invention, the indicating pointer 3 and scale 4 are also depicted in FIG. 3 of the drawing. As explained above, FIG. 3 depicts the outer surface of the housing element 1, showing the reverse side thereof vis-a-vis the view shown in FIG. 1.

Referring again to FIG. 1, the manually operable clamping mechanism 5 of the present invention is shown in its stored position. The mechanism 5 in this embodiment of the invention comprises a generally U-shaped metal clamping member 6 that preferably is formed of brass wire. The ends 6A and 6B of the clamping member 6 are inwardly turned to provide pivots for securing the clamping member in a desired pivotal relationship that will be explained below. The ends 6A and 6B of the clamping member are secured in a mounting means 7 that comprise a pair of spaced boasses 7A and 7B (also see FIG. 2) molded or otherwise suitably formed on the inner surface of the instrument housing element 1. The bosses 7A and 7B each have a detent 7A' and 7B', respectively, formed therein to receive for pivotal movement one of the inwardly turned ends 6A or 6B of the clamping member 6. The detent 7A' is illustrated in cross-section phantom view in FIG. 2. The mounting means 7 further comprises a pair of Belville-type tooth-spring washers 8 and 9 that are resiliently mounted or clamped, respectively, on the upper post-like ends of bosses 7A and 7B in a position such that they at least partially extend over the detents 7A' and 7B' thereby to retain the ends 6A and 6B of the clamping member rotatably supported within the detents. It will be appreciated from the description of the invention thus far that the mounting means 7 is effective to support the clamping member 6 for relatively free pivotal movement with respect to the housing element 1.

Movement of the clamping member 6 is controlled pursuant to the present invention by a manually operable actuating member 10 that comprises a central post portion 10A (see FIG. 2), a button portion 10B and a disc portion 10C. The actuating member 10 preferably is formed of a suitable molded plastic material such as LEXAN resin or any other similarly rigid, workable material. As best seen in FIG. 2, the post portion 10A of the actuating member 10 is arranged to extend through an aperture 11 that is defined by any suitable wall means 11A through the housing element 1. In its assembled position the button portion 10B of the actuating member 10 is disposed on the outer end of the post portion 10A thereof for slidable movement relative to the outer surface of the instrument housing element 1 in a first direction shown by the arrow 12 and in a second direction shown by the arrow 13 in FIG. 2. The critical size and arrangement of the disc portion 10A of the actuating member will be more fully described below after the other novel components of this embodiment of the invention are discussed.

With the actuating member 10 supported in the aperture 11 for movement relative thereto, a connector 14 in the form of a generally flat, resilient strip of metal such as phosphor bronze is provided to transmit the actuating motion of actuating member 10 to the clamping member 6. The connector 14 is provided with an aperture 14 therethrough that is just large enough to slidably encompass the reduced diameter part of post portion 10A on the actuating member 10. As selectively moved in said first direction 12 or in the second direction 13, the post portion 10A will alternately engage the opposite sides of the aperture 14A thereby driving the strip of metal comprising connector 14 in said directions of movement.

In addition to being coupled as just described to the actuating member 10, the connector 14 is fastened by welding 15, or other suitable conventional means, to the mid-point of the pivotally mounted clamping member 6 at a point thereon remote from the mounting means 7. Due to this novel arrangement of the component parts of this embodiment of the invention, the connector 14 is operable responsive to movement of the actuating member 10 in a first direction (12) to positively move the clamping member 6 to its stored position, as shown in FIGS. 1 and 2. More specifically, by observing the relative positions of the components shown in FIG. 2 it will be seen that movement of the actuating member 10 in the first direction 12, away from the point on the clamping member 6 to which the connector 14 is fastened, causes the connector 14 to be straightened so that it transmits a pulling or tension force to the pivotal clamping member 6 causing it to move toward the housing element 1. Conversely, it will be understood that movement of the actuating member 10 in the second direction 13 moves it toward the point on the clamping member 6 to which the connector 14 is fastened thereby causing the connector 14 to bend and become resiliently loaded. This resilient loading causes the connector 14 to bias the clamping member 6 toward its stored position, even while it is disposed in a clamping position that forces the indicating pointer 3 against the indicating scale 4 shown in FIG. 2. The clamping position of the clamping member 6 is shown in phanton and designated by the numeral 6' in FIG. 2, to further an understanding of the invention.

Finally, the clamping mechanism 5 of the invention includes a bistable retaining means for selectively holding the clamping member respectively in either its clamping or stored position after movement of the actuating member 10 has terminated. In the form of the invention being described the bistable retaining means 16 comprises a resilient strip of metal such as brass that forms a generally flat strip 16A having an aperture 16B through the center thereof that is just large enough to slidably accommodate the reduced diameter portion of the post portion 10A of actuating member 10, as best seen in FIG. 2. The resilient strip 16A also has a first boss 16C and a second boss 16D formed therein by suitably crimping or otherwise deforming the strap. The bosses 16C and 16D are arranged to cooperate respectively with a first detent 17 and a second detent 17A formed in the inner surface of the housing element 1 by a suitable molding or drilling process.

It will be seen by examining FIG. 2 that the resilient strap 16A of the retainer means 16 is coupled to the actuating member 10 for movement thereby to position the first boss 16C in the first detent 17 responsive to movement of the actuating member 10 in the above-mentioned first direction 12 which moves the clamping member 6 to its stored position. Alternatively, this coupling arrangement also is effective to position the second boss 16D in the second detent 17A, responsive to movement of the clamping member 6 to its clamping position when the actuating member 10 is moved in the second direction 13, as described above. Thus, it will be appreciated that the unique retainer means of the present invention is effective to positively hold the clamping member 6 out of engagement with the pivotal indicating pointer 3 when the clamping member is moved to its stored position. The snap action sensed by an operator when the boss 16C of the metal strap 16A snaps into the first detent 17 effectively informs him that the clamping member is thus securely positioned in its stored position.

Returning briefly now to a further description of the structure and arrangement of the actuating member 10; it should be understood that the disc portion 10C thereof is formed to be substantially larger than the apertures 14A and 16B respectively formed in the metal strips 14 and 16A of the connector and retainer means described above. Accordingly, the disc portion 10A serves to securely lock the metal strips in their desired operating relationship, coupled to the actuating member 10. Moreover, in this embodiment of the invention the disc portion 10 is spaced from the inner surface of the housing element 1 a predetermined distance such that the metal strip 16A of the retainer means 16 is continuously bias, resiliently toward the bottoms of the detents 17 and 17A in the housing element 1. In this embodiment of the invention the disc portion 10C is formed on the post portion 10A of the actuating member 10 by heating the inner end of the post portion 10 in a suitable, conventional heat-staking operation that temporarily melts the disc portion and expands it outward relative to the apertures 14A and 16B to a configuration such as that generally indicated in FIG. 2. Obviously other suitable means could be used in alternative forms of the invention to couple the connector 14 and the retainer means 16 to the actuating member 10.

The operation of the invention will probably be fully understood by those skilled in the art from the foregoing description of the structure and individual operating sequences of the component parts of it as described above. However, to briefly summarize the operation, it will be appreciated that the clamping member 6 is shown in its stored position in FIG. 2 of the drawing. Assuming now that an operator wishes to secure the instrument indicating pointer 3 in its clamped position (6') in which the indicating pointer 3 is forced against the indicating scale 4, the operator will move the button portion 10B of the actuating member 10 in the second direction 13 and described above and shown in FIG. 2. Such movement will force the boss 16C on the retaining means 16 out of the detent 17 in housing element 1 and force the metal strip 16A to move toward the point on clamping member 6 that is fastened to the connector 14. That movement will continue until the boss 16D on the retainer means 16 is snapped into the detent 17A in housing element 1 thereby to retain the clamping element 6 in its clamping position 6' against the instrument indicating pointer 3, holding it securely against the indicating scale 4. At the same time, such movement in the direction 13 of the actuating member 10 forces the apertured end of the connector 14 to move toward the same point on the clamping member 6 thereby to bend the connector 14 and resiliently load it to bias the clamping element 6 to return to its stored position. However, the retaining action of the boss 16D interacting with the detent 17A is stronger than the resilient biasing action loaded into the connector 14, therefore, until such time as an operator positively moves the button portion 10B of the actuating member 10 in the above-noted first direction 12, the bistable retainer means 16 will act to hold the clamping member 6 in its clamping position. Of course, to return the clamping member to its stored position the operator simply moves the button portion 10B of the actuating member 10 in the above-noted first direction 12 thereby to force both of the metal strips, connector 14 and bistable retainer strip 16A, to move in a direction away from the point on clamping member 6 to which the connector 14 is fastened. That movement forces the boss 16D out of the recess 17A and subsequently snaps the boss 16C into the detent 17 in housing element 1 after the connector 17 has been straightened to cause the clamping member 6 to be pulled into its stored position where it is retained by the interaction of the retainer means 16; specifically, the cooperation between the boss 16C and detent 17.

From the foregoing description of the invention it will be apparent to those skilled in the art that various modifications and improvements may be made therein without departing from the teaching of the invention; accordingly, it is our intention to encompass within the following claims the true spirit and scope of the invention.

What we claim as new and desire to secure by Letters Patent of the United States is:

1. In an instrument having a scale and an indicating pointer mounted for movement relative to the scale the improvement comprising a bistable, manually operable clamping mechanism for selectively retaining an instrument pointer clamping member in either a pointer-clamping position or a stored position and for positively moving the clamping member between said position, said mechanism comprising an instrument housing element, an instrument pointer clamping member, mounting means disposed in fixed relationship to the instrument housing element for pivotally mounting the clamping member, wall means defining an aperture through said housing element, a manually operable actuating member supported in said aperture for movement relative thereto, a connector coupled to said actuating member and fastened to said clamping member at a point thereon remote from the mounting means, said connector being operable responsive to movement of the actuating member in a first direction to move the clamping member to its stored position and being further operable responsive to movement of the actuating member in a second direction to move the clamping member to its clamping position against an instrument indicating pointer, and a bistable retaining means for selectively holding the clamping member respectively in either said clamping or stored position upon termination of movement of the actuating member.

2. An invention as defined in claim 1 wherein said bistable retaining means comprises a resilient strap having first and second spaced bosses thereon, and first and second detents formed in said instrument housing element to receive therein respectively said first and second bosses, said resilient strap being coupled to the actuating member for movement thereby to position the first boss in the first detent responsive to movement of the clamping member to its stored position and to position the second boss in the second detent responsive to movement of the clamping member to its clamping position.

3. An invention as defined in claim 2 wherein said connector and said resilient strap of the retaining means each comprise a generally flat, resilient strip of metal having an aperture therethrough, said apertures in the strips of metal being arranged to receive therein a portion of said actuating member that is selectively operable when moved in said first and second directions to engage respectively opposite sides of said apertures thereby to drive the strips of metal in said directions of movement.

4. An invention as defined in claim 3 wherein said actuating member comprises a central post portion extending through the aperture in said instrument housing and the apertures in said resilient strips of metal, and a button portion disposed on the outer end of the post portion for slidable movement relative to the outer surface of the instrument housing in said first and second directions responsive to manual actuation.

5. An invention as defined in claim 4 wherein said actuating member further comprises a disc portion disposed at the inner end of said post portion, said disc portion being larger in diameter than the apertures through said strips of metal and being spaced a predetermined distance from said instrument housing element thereby to retain the metal strips in a position such that said strips are continuously biased by contact with said disc portion resiliently toward the bottoms of said detents in the housing element.

6. An invention as defined in claim 1 wherein said clamping member is generally U-shaped, with inwardly turned ends, and wherein said mounting means comprise a pair of spaced bosses on an inner surface of said instrument housing element, said bosses each having a detent formed therein to receive for pivotal movement therein, respectively, one of said inwardly turned ends on the U-shaped clamping member.

7. An invention as defined in claim 6 wherein said mounting means further comprises a pair of tooth-spring washers resiliently mounted, respectively, on said bosses on the housing element and at least partly over the detents in said bosses thereby to retain the ends of the clamping member in said detents.

8. An invention as defined in claim 7 wherein movement of the actuating member in said first direction moves it away from the point on said clamping member to which said connector is fastened thereby to straighten the connector, and wherein movement of the actuating member in said second direction moves it toward the point on the clamping member to which said connector is fastened thereby to bend the connector to resiliently load it causing the connector to resiliently bias the clamping member toward its stored position.

* * * * *